United States Patent [19]

Sadeh et al.

[11] Patent Number: 4,970,401
[45] Date of Patent: Nov. 13, 1990

[54] NON-CONTACT TRIANGULATION PROBE SYSTEM

[76] Inventors: Yaacov Sadeh, Bialik Street 11/6, New Ziona; Yaacov Makover, Bet Elazari, Rechovot, both of Israel

[21] Appl. No.: 353,001

[22] Filed: May 17, 1989

Related U.S. Application Data

[63] Continuation-in-part of Ser. No. 147,133, Jan. 22, 1988, abandoned.

[51] Int. Cl.$^5$ .................... G01B 11/02; G01B 11/24
[52] U.S. Cl. ........................................ 250/560; 356/1; 356/376
[58] Field of Search ............... 250/560; 356/1, 376, 356/377, 379, 380, 383, 384, 387

[56] References Cited

U.S. PATENT DOCUMENTS 3,970,847  7/1976  Wood ................................. 250/560
4,325,640  4/1982  Dreyfus et al. .................... 356/376
4,785,193  11/1988  Dassler et al. .................... 356/387

Primary Examiner—Edward P. Westin
Attorney, Agent, or Firm—Price, Heneveld, Cooper, DeWitt & Litton

[57] ABSTRACT

A non-contact triangulation probe system including a base plate; a first non-contact triangulation probe including a light source mounted on a first movable slide, the first slide being disposed on the base plate and arranged for sliding motion therealong, a source of movement for the first slide being associated therewith; a first position sensor for determining the relative position of the first probe and providing an output signal corresponding thereto; a second non-contact triangulation probe including a light source mounted on a second movable slide, the second slide being disposed on the base plate and arranged for sliding motion in the same direction as the first slide, a source of movement for the second slide being associated therewith; a second position sensor for determining the relative position of the second probe and providing an output signal corresponding thereto; the first and second probes being arranged to face each other such that the light beams emitted by the probes coincide on the same optical axis; a microcomputer arranged to actuate the source of movement for the first and second slides, to receive the output signals from the first and second position sensors, and to receive output signals from the first and second probes.

6 Claims, 4 Drawing Sheets

NON-CONTACT TRIANGULATION PROBE SYSTEM

This application is a continuation-in-part of United States patent application Ser. No. 147,133, filed Jan. 22, 1988, now abandoned.

FIELD OF THE INVENTION

The present invention relates to a non-contact measuring system attachable to a robotic arm and, in particular, to such a system including three non-contact optical triangulation probes.

BACKGROUND OF THE INVENTION

Non-contact measuring systems have existed for quite some time. However, present sYstems have several drawbacks which limit their use only to quality assurance tasks in a well controlled environment.

The major drawback of today's measuring system is that the measured body must lie motionless in the measuring area of the system in order to perform accurate measurements. Since the measuring system uses the acquired data, in a series of isolated measurements, to calculate the measured body's dimensions, any movement of the measured body relative to the measuring system will destroY the accuracy of the complete process.

Unfortunately, this is the case when trying to measure a part during the manufacturing process on the processing machine, on the conveyor line or even along-side the production line. The reason lies in the fact that the environment at the production line and on the machines is loaded with mechanical vibration and translations which prevent the implementation of the present measuring systems in production line applications.

SUMMARY OF THE INVENTION

An object of the present invention is to provide a measuring system which overcomes the above noted limitation. Hence the system proposed according to this invention can measure, without contact, moving or vibrating parts with circular symmetry, such as parts produced by a lathe. The measurement can take place either on the lathe during the machining process or while moving the part on a conveyor.

There is provided according to the present invention a non-contact triangulation probe including a light source which projects a narrow beam through a focusing lens, into a focused spot on a measured surface. A second lens images this spot onto a detector which is mounted diagonally relative to the falling narrow beam.

Two non-contact triangulation probes constructed in accordance to the said structure are mounted on two moving slides, facing each other. The said probes are mounted and leveled in a way which coincides the two light beams emitted by the probes on the same optical axis. The said slides move along a baseplate (hereafter called the y baseplate) in the y direction by means of two servo motors. Two position sensors such as optical shaft encoders determine the location of the two probes relative to each other and to the y baseplate.

The said baseplate is further sliding along a second baseplate (hereafter called the x baseplate) in the x direction perpendicular to the y direction—the movement of the two probes. The motion of the y baseplate along the x baseplate is accomplished by means of a ball screw mechanism which is attached to a third servo motor. The position of the y baseplate along the x baseplate is determined by another position transducer such as an optical shaft encoder.

A third non-contact triangulation probe, similar in construction to the first two probes, is mounted on one edge of the x baseplate with its light beam level with the beams of the first two probes and pointing along the x direction of movement.

The system operates under the supervision of a microcomputer. The microcomputer receives information from the three position encoders regarding the location of the two probes on the y stage and of the Y stage on the x stage. The microcomputer also receives video data from the three non-contact probes. The microcomputer further issues driving signals to the three servo motors via drive amplifiers. Hence the motors move the two measuring probes in both x and y directions, according to a predetermined measurement program, while monitoring the dimensions of the measured body in both radial and axial directions.

Since the measured body is located and measured simultaneously by three non-contact probes, the location of the body relative to the measuring system does not affect the accuracY of the measurement because the body remains within the dynamic measurement range of the probes and because the frequencY of vibrations of the body relative to the measuring system is considerably lower compared to the band width of the measurements frequency.

The whole assembly is either stationary or mountable on a moving manipulator such as a robot's arm.

BRIEF DESCRIPTION OF THE DRAWINGS

Further features and advantages of the invention will be apparent from the description below.

The invention is herein described by way of example only with reference to the accompanying drawings wherein.

DESCRIPTION OF A PREFERRED EMBODIMENT

Figure 1:
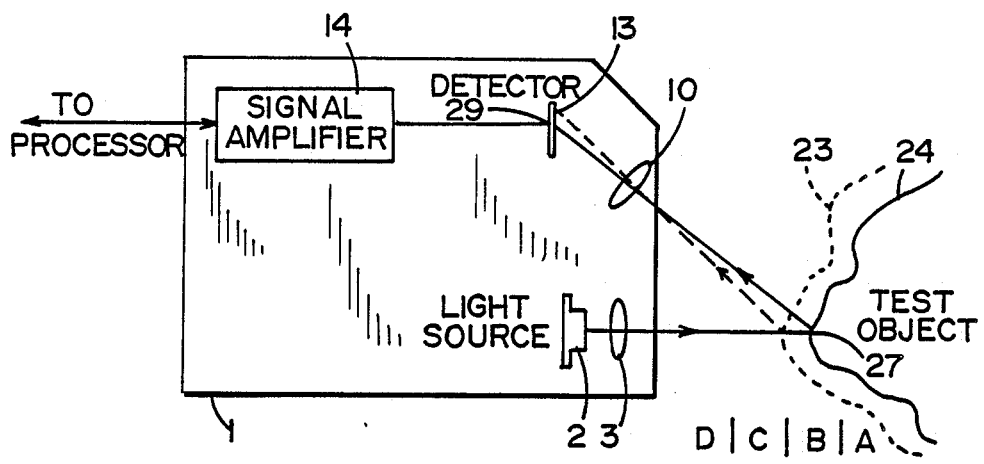
FIG. 1 is a schematic illustration of one form of a non-contact triangulation probe operative in the system of the present invention.

A non-contact probe operative in the present invention is illustrated in FIG. 1. One such probe is disclosed and claimed in our co-pending U.S. Patent Application 147,134. A mainframe 1 holds a light source 2. Light source 2 may comprise a laser diode or any other suitable light source. The light is collected by the focusing lens 3.

The light is focused on the measured surface when in position 24, at point 27.

The light reflected from the focusing point on surface 24 is collected by imaging lens 10. The light is then projected on a detector 13. The optical distance from lens 10 to the detector 13 is adjusted so that a magnified focused image of the spot of light 27 is generated on the detector at 29. The dynamic range of measurement of the probe is demonstrated by the two extreme cases where the measured surface moves to either location 23 or to location 24.

A signal amplifier 14 carries all the analog electronics which generates the ingoing and outcoming signals to the probe.

Figure 2:
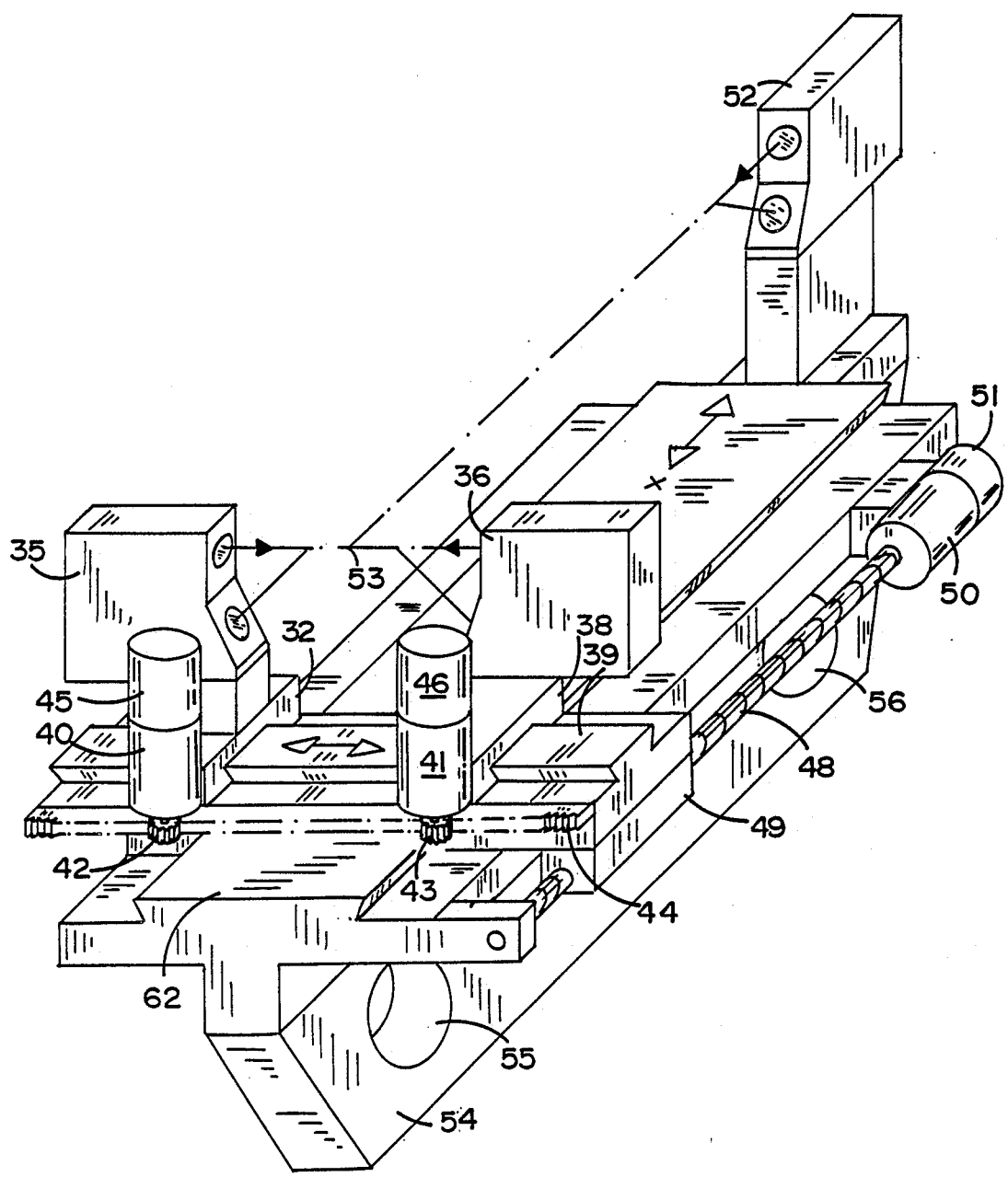
FIG. 2 is a three dimensional view illustrating the measuring system using one favorable construction.

The incorporation of several probes, such as described in FIG. 1, into a measuring system is demonstrated in FIG. 2. It will be appreciated, however, that any other non-contact optical probe may alternately be used in the measuring system of the present invention.

Two probes 35 and 36 are mounted on slides 37 and 38. The slides move on a baseplate 39 in the y direction. The movement of the two probes is generated by motors 40 and 41 which rotate pinions 42 and 43 respectively. The pinions move the probes 35 and 36 along the rack 44, thereby moving them along baseplate 39. Two encoders 45 and 46 determine the position of probes 35 and 36 respectively along the y baseplate.

The complete assembly, which is mounted on baseplate 39 as described above, slides along a second baseplate 47. Baseplate 39 is moved along baseplate 47 by means of a ball screw 48 and a mating nut 49 which is mounted on baseplate 39. The ball screw is rotated by motor 50. An encoder 51 determines the location of the complete assembly mounted on baseplate 39 along baseplate 47.

A third non-contact probe 52 is mounted on baseplate 47 with its light beam optical axis directed along the x direction. The optical axes of the light beams of the three probes 35, 36 and 52 coincide in point 53 in space.

Baseplate 47 is further equipped with an extended arm 54. The arm has two holes 55 and 56 intended to enable the gripping of the complete assembly described in FIG. 2 by a robot's arm. This way the complete measuring system can be mounted and manipulated by a robot in order to perform measurements of a part while on a cutting machine or moving on a conveyor belt.

It should be appreciated that there are several available mechanical configurations which enable the movement of the two probes 35 and 36 on baseplate 39. There are also various configurations which allow the movement of baseplate 39 along baseplate 47. The configuration demonstrated at FIG. 2 is for purpose of example only and it should not limit therefor the generality of the concept according to which the probes are being moved in the x and y directions upon measuring a given body.

Figure 3:
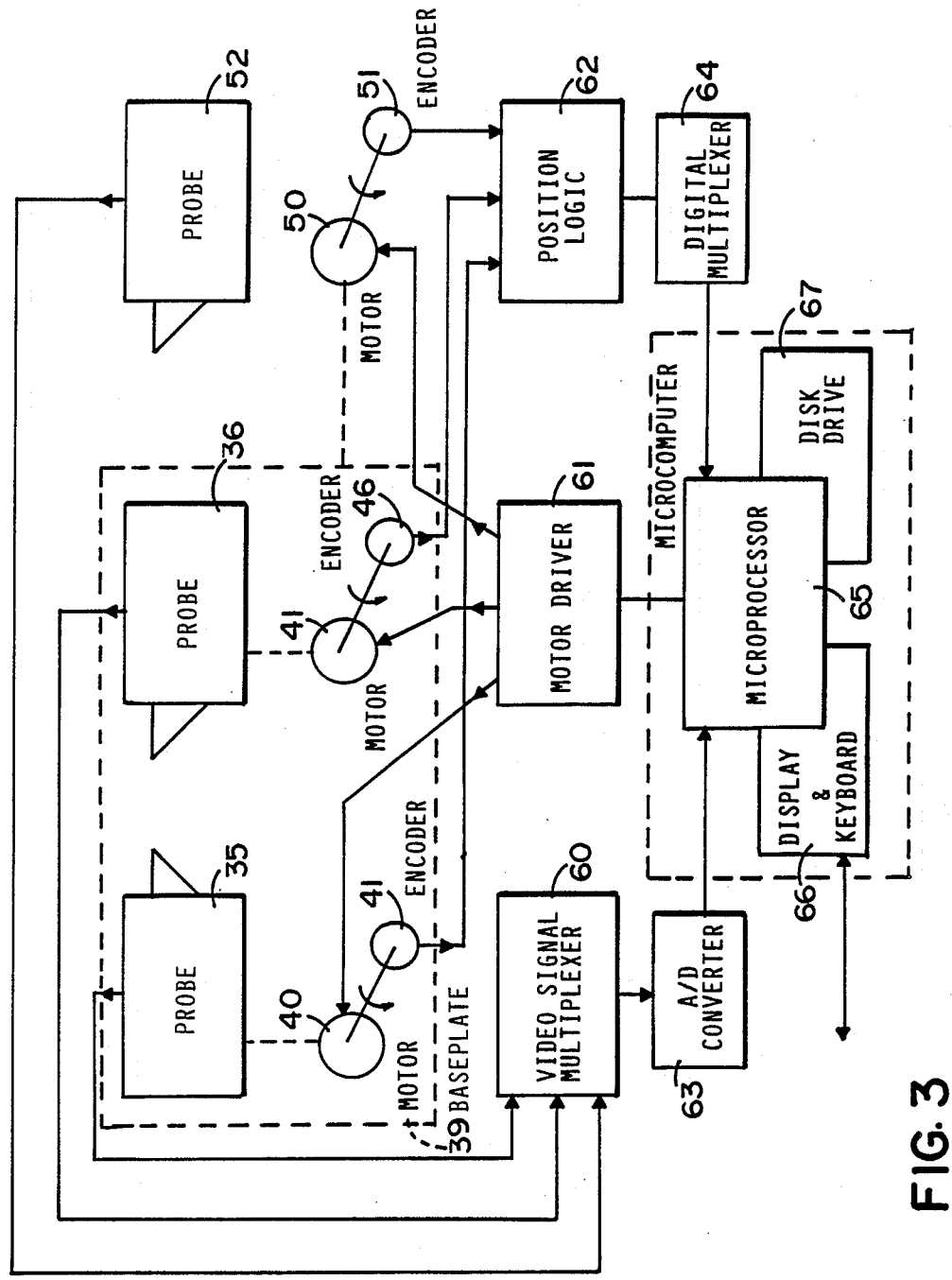
FIG. 3 is a block diagram of the measuring system and the electronic circuitry which operates the measurement process.

FIG. 3 is a block diagram of the measuring system. The video signals from the three non-contact probes enter the video signal multiplexer 60. Then each signal is converted from analog to digital data by the A/D converter 63 and transferred to the microprocessor 65. The position of the two probes 35 and 36 along the y axis and the position of baseplate 39 along the x axis is determined by encoders 45, 46 and 51 respectively. The signals from the three encoders are transferred to the position logic circuit 62 from which the position data is transferred via digital multiplexer 64 to the microprocessor 65. The microprocessor controls the three motors 40, 41 and 50 via the motor driving circuit 61.

The measurement program is prepared by the microcomputer either by the operator using the keyboard unit 66 or by reading a measurement program from a diskette using the disk drive 67.

Figure 4A:
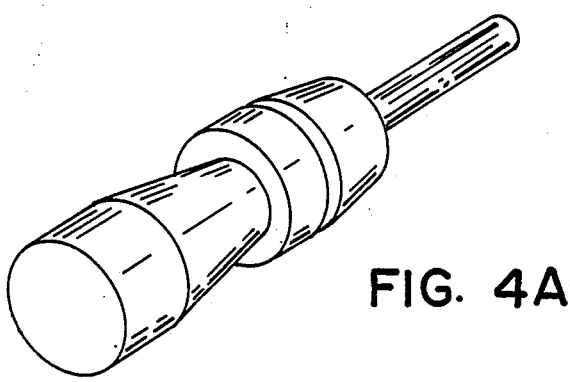
FIGS. 4a and 4b show different views of a circular body which is typically processed by a lathe and the dimensions which can be extracted by the measuremenet system which is described in this invention.
Figure 4B:
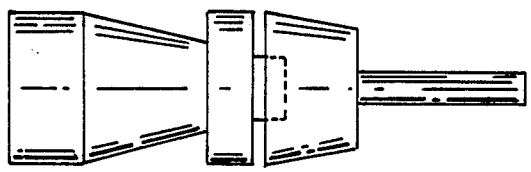

FIG. 4a demonstrates, by way of example, one of the possible parts measurable by the measurement system. The three dimensional part 70 can be measured for all the dimensions which are designated on the projection of this part, as demonstrated in FIG. 4b. The marked dots indicate the points of diametral measurements along the body's contour. Analysis of the measured data by the microcomputer results in the calculation of all the dimensions of the measured body along its diametral contour.

In a typical operational scenario the operator enters a measurements program into the microcomputer. The program can be introduced either by reading it from a prepared disk which is inserted to the disk drive 67, or by a direct transformation of data from a host computer via the data link or it can be prepared directly on the measuring system using the keyboard and a joystick in order to move the system along a sample part, hence teaching the measurement system where to measure and what dimension is expected at each measuring point.

Once a measuring program is introduced to the system in either way, the measuring system starts the measurement sequence by moving the two probes 35 and 36 along the y axis in accordance with the expected diameter. When the measured part enters the measurement range of both probes, a diametral measurement is taken by both probes simultaneously. Then the baseplate 39 moves the two probes in the x direction along baseplate 47, to the next location of diametral cross section to be measured.

If a complete profile of the measured part is required, the third measuring probe is directed against the end of the part, when taking a dimension in the y direction, the probe 52 is also read. Its data together with the location data of baseplate 39 which is read by encoder 51 determine the location of the part's x dimension of the y cross section being measured. This measurement is relative to the part's longitudinal location relative to the measuring system at the instant of measurement, disregarding any temporal movements of the part within the measuring range of the three non-contact probes 35, 36 and 52.

We claim:
1. A non-contact triangulation probe system comprising:
   a base plate;
   a first non-contact triangulation probe including a light source and a detector therefor mounted on a first movable slide means, said first slide means being disposed on said base plate and arranged for sliding motion therealong, means for moving said first slide means being associated therewith;
   a first position sensor for determining the relative position of said first probe and providing an output signal corresponding thereto;
   a second non-contact triangulation probe including a light source and a detector therefor mounted on a second movable slide means, said second slide means being disposed on said base plate and arranged for sliding motion in the same direction as said first slide means, means for moving said second slide means being associated therewith;
   a second position sensor for determining the relative position of said second probe and providing an output signal corresponding thereto;
   said first and second probes being arranged to face each other such that the light beams emitted by the probes coincide on the same optical axis;
   microcomputer means arranged to actuate the means for moving said first and second slide means, to receive said output signals from said first and sec- ond position sensors, and to receive output signals from said first and second probes.

2. A non-contact triangulation probe system according to claim 1 and further comprising:
a second base plate;
the first base plate being coupled to said second base plate and arranged for motion perpendicular thereto, means for moving said first base plate being associated therewith;
a third position sensor for determining the position of the first base plate relative to the second base plate and providing an output signal corresponding thereto; and
a third non-contact triangulation probe including a light source and a detector therefor mounted on said second base plate and disposed for probing in a direction perpendicular to said first and second probes, the light beam emitted by said probe intersecting the beams of said first and second probes;
said microcomputer means being arranged to actuate the means for moving said first base plate, to receive said output signals from said third position sensor, and to receive output signals from said third probe.

3. A non-contact triangulation probe system according to claim 1 wherein each said position sensor comprises an optical shaft encoder.

4. A non-contact triangulation probe system according to claim 2 wherein each said position sensor comprises an optical shaft encoder.

5. A non-contact triangulation probe system according to claim 2 further comprising means affixed to said second base plate for engagement by a robot.

6. A non-contact triangulation probe system according to claim 3 wherein each said means for moving comprises servo motor means with associated drive amplifiers.

* * * * *